J. R. GAMMETER.
METAL STUDDED TIRE.
APPLICATION FILED MAY 2, 1916.
1,214,537.
Patented Feb. 6, 1917.
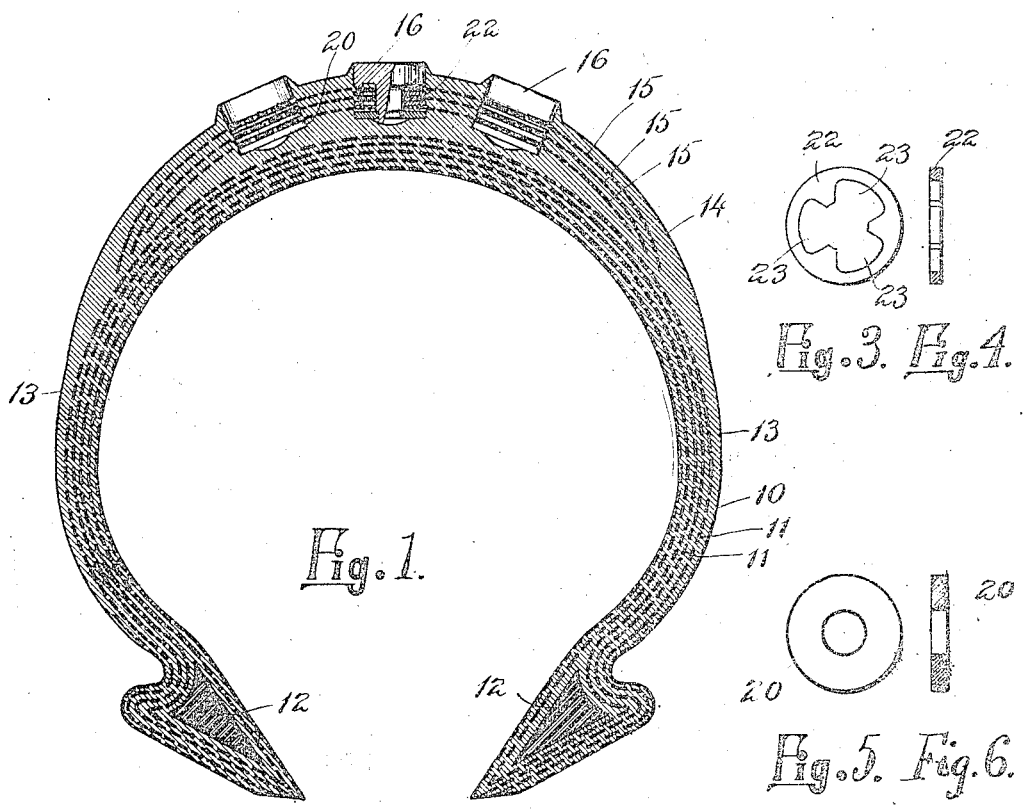
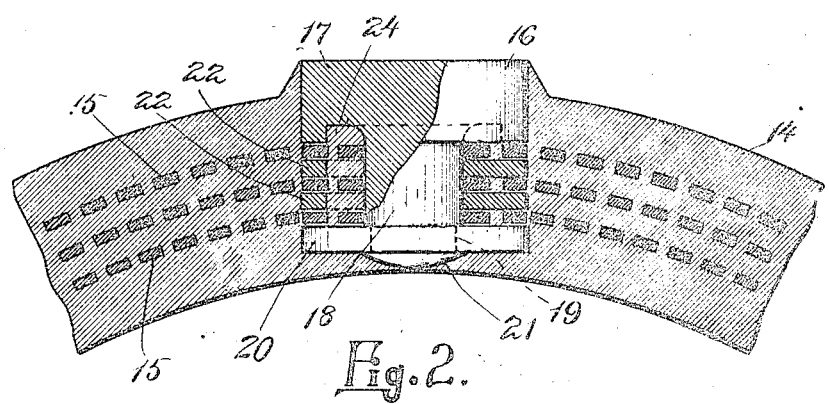
INVENTOR.
J. R. Gammeter
BY Robert M. Pierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METAL-STUDDED TIRE.

1,214,537.  Specification of Letters Patent.  Patented Feb. 6, 1917.

Application filed May 2, 1916. Serial No. 94,894.

*To all whom it may concern:*

Be it known that I, JOHN R. GAMMETER, a citizen of the United States, residing at Akron, in the county of Summit and State of Ohio, have invented certain new and useful Improvements in Metal-Studded Tires, of which the following is a specification.

This invention relates to pneumatic tire casings having metal studs on the tread to give extra gripping power. It has heretofore been a difficult matter properly to anchor these studs to the body of the tire, the prevailing method being to affix them to a leather band which is cemented to the tire carcass, but this makes an expensive article and is not wholly satisfactory as the leather-studded bands frequently come off and the leather is likely to become burned by the heat generated in the studs through friction with pavements and bending of the imperfectly-flexible tire wall.

My invention has for its object to provide a studded tire structure of reasonable cost, in which the studs are securely anchored and the tread is more firmly attached to the tire carcass, and is less liable than formerly to destruction by heat generated in the running of the tire.

Of the accompanying drawings, Figure 1 represents a transverse section of a pneumatic tire casing provided with my improvement. Fig. 2 represents an enlarged section of the tread. Fig. 3 represents a plan view and Fig. 4 a cross section of one of the intermediate washers in the stud anchorage. Figs. 5 and 6 represent similar views of the end washer.

Referring to the drawings, 10 indicates a clencher tire casing whose carcass is made up in the usual way of layers of frictioned fabric 11 (for which cord layers may be substituted) and beads 12, covered by rubber side strips 13 and a thickened rubber tread 14. In the tread I incorporate a plurality of fabric strips 15 which for convenience may be termed breaker strips as they have approximately the usual location and function of the element or elements of that name. In this case the strips 15 have the additional function of serving as an anchorage for the metal traction studs 16 and I have illustrated the use of three such strips in order to insure a very firm anchorage for the studs. Each stud 16 is provided with a head 17 which forms the wearing and gripping member for engagement with the ground, and is further provided with a cylindrical stem 18 passing through the fabric strips 15. The inner portion of said stem is formed with a reduced neck 19 occupying the hole in a plate or washer 20 which is shown in detail in Figs. 5 and 6, the end of the stud stem being riveted over at 21 to lock the washer upon the stem.

22, 22 are plates or washers slidingly mounted upon the stem 18 and acting as separators between the fabric strips 15. These plates are cut away as shown at 23 in Fig. 3 to form holes or recesses occupied by the rubber of the tread wall, so that the fabric strips are rubber-locked or vulcanized to each other through the plates 22 within the stud structure. Further to promote the internal locking of the rubber with said structure, the under side of the stud head 17 is undercut or grooved at 24.

It will be seen that the studs 16 are thereby separately anchored to the respective fabric strips 15 and the latter in turn are thoroughly embedded in and separated from each other by the tread-rubber. The tread is made up separately from the carcass with alternate layers of rubber and rubberized fabric 15, the latter being laid one ply at a time and the studs and washers assembled therewith and finally riveted thereto as will be obvious, after which the studded fabric and rubber tread is applied to the carcass, its ends joined in any suitable manner and the whole casing vulcanized into a unit structure.

I claim:

1. A pneumatic tire having in the tread wall thereof a plurality of fabric strips, a series of traction studs each of which has a head at the tire surface, a stem extending through the several said strips, a spacing washer on the stem located between two of said strips, and a rivet washer on the inner end of said stem.

2. A pneumatic tire having in the tread wall thereof a plurality of fabric strips and rubber, a series of traction studs each having an outer head, a stem passing through the several said strips, a washer riveted on the inner end of said stem, and a spacing washer located between two of said strips, said spacing washer being slidably guided on said stem and formed with a series of recesses or openings through which the rubber of the tread wall passes.

3. A pneumatic tire having in the tread wall thereof a plurality of fabric strips and rubber, and a series of traction studs separately anchored to the respective strips, each stud having a head at its outer end undercut on its inner side to receive the tread rubber.

In testimony whereof I have hereunto set my hand this 29th day of April, 1916.

JOHN R. GAMMETER.